(12) United States Patent
O'Hagan

(10) Patent No.: US 7,831,429 B2
(45) Date of Patent: *Nov. 9, 2010

(54) SPEECH RECOGNITION SYSTEM AND METHOD FOR EMPLOYING THE SAME

(75) Inventor: Timothy P. O'Hagan, The Woodlands, TX (US)

(73) Assignee: Symbol Technologies, Inc., Holtsville, NY (US)

( * ) Notice: Subject to any disclaimer, the term of this patent is extended or adjusted under 35 U.S.C. 154(b) by 539 days.

This patent is subject to a terminal disclaimer.

(21) Appl. No.: 11/675,899

(22) Filed: Feb. 16, 2007

(65) Prior Publication Data

US 2007/0150283 A1 Jun. 28, 2007

Related U.S. Application Data

(63) Continuation of application No. 09/057,261, filed on Apr. 8, 1998, now Pat. No. 7,191,135, which is a continuation-in-part of application No. 08/699,632, filed on Aug. 19, 1996, now Pat. No. 5,867,817.

(51) Int. Cl.
G10L 11/00 (2006.01)

(52) U.S. Cl. .................... 704/270; 704/231

(58) Field of Classification Search ................ 704/231, 704/270
See application file for complete search history.

(56) References Cited

U.S. PATENT DOCUMENTS

| | | | |
|---|---|---|---|
| 4,279,021 A | 7/1981 | See et al. | |
| 5,202,817 A | 4/1993 | Koenck et al. | |
| 5,426,745 A * | 6/1995 | Baji et al. | 345/469 |
| 5,576,981 A | 11/1996 | Parker et al. | |
| 5,867,817 A | 2/1999 | Catallo et al. | |
| 5,960,399 A * | 9/1999 | Barclay et al. | 704/270.1 |
| 5,995,105 A * | 11/1999 | Reber et al. | 715/835 |
| 6,188,683 B1 * | 2/2001 | Lang et al. | 370/352 |
| 7,191,135 B2 | 3/2007 | O'Hagan | |

OTHER PUBLICATIONS

Crow, B.P.; Widjaja, I.; Kim, L.G.; Sakai, P.T., "IEEE 802.11 Wireless Local Area Networks," Communications Magazine, IEEE, vol. 35, No. 9, pp. 116-126, Sep. 1997.*

Texas Instruments News Release, Sep. 27, 1996, New Speech Recognition Software Technology From TI Ushers in the Next Generation of Browsing the Internet by Voice, http://www.ti.com/corp/docs/press/company/1996/c96050.shtml.

PR Newswire, Oct. 20, 1998, Speech Solutions Announces 'Conversational' speech Technology for the Internet, http://www.findarticles.com/cf_0/m4PRN/1998_Oct_20/530986968/print.jhtml.

Office Action dated Nov. 9, 1999 in related case U.S. Appl. No. 09/057,261.

(Continued)

*Primary Examiner*—Richemond Dorvil
*Assistant Examiner*—Douglas C Godbold

(57) ABSTRACT

A speech recognition system that includes a host computer which is operative to communicate at least one graphical user interface (GUI) display file to a mobile terminal of the system. The mobile terminal includes a microphone for receiving speech input; wherein the at least one GUI display file is operative to be associated with at least one of a dictionary file and syntax file to facilitate speech recognition in connection with the at least one GUI display file.

16 Claims, 12 Drawing Sheets

OTHER PUBLICATIONS

Final Office Action dated Jul. 18, 2000 in related case U.S. Appl. No. 09/057,261.
Advisory Action dated Oct. 25, 2000 in related case U.S. Appl. No. 09/057,261.
Final Office Action dated Jul. 30, 2001 in related case U.S. Appl. No. 09/057,261.
Advisory Action dated Oct. 22, 2001 in related case U.S. Appl. No. 09/057,261.
Office Action dated Dec. 14, 2001 in related case U.S. Appl. No. 09/057,261.
Final Office Action dated Jun. 6, 2002 in related case U.S. Appl. No. 09/057,261.
Advisory Action dated Aug. 27, 2002 in related case U.S. Appl. No. 09/057,261.
Examiner's Answer mailed Mar. 12, 2003 to Appeal Brief in related case U.S. Appl. No. 09/057,261.
Decision on Appeal mailed Apr. 26, 2004 in related case U.S. Appl. No. 09/057,261.

* cited by examiner

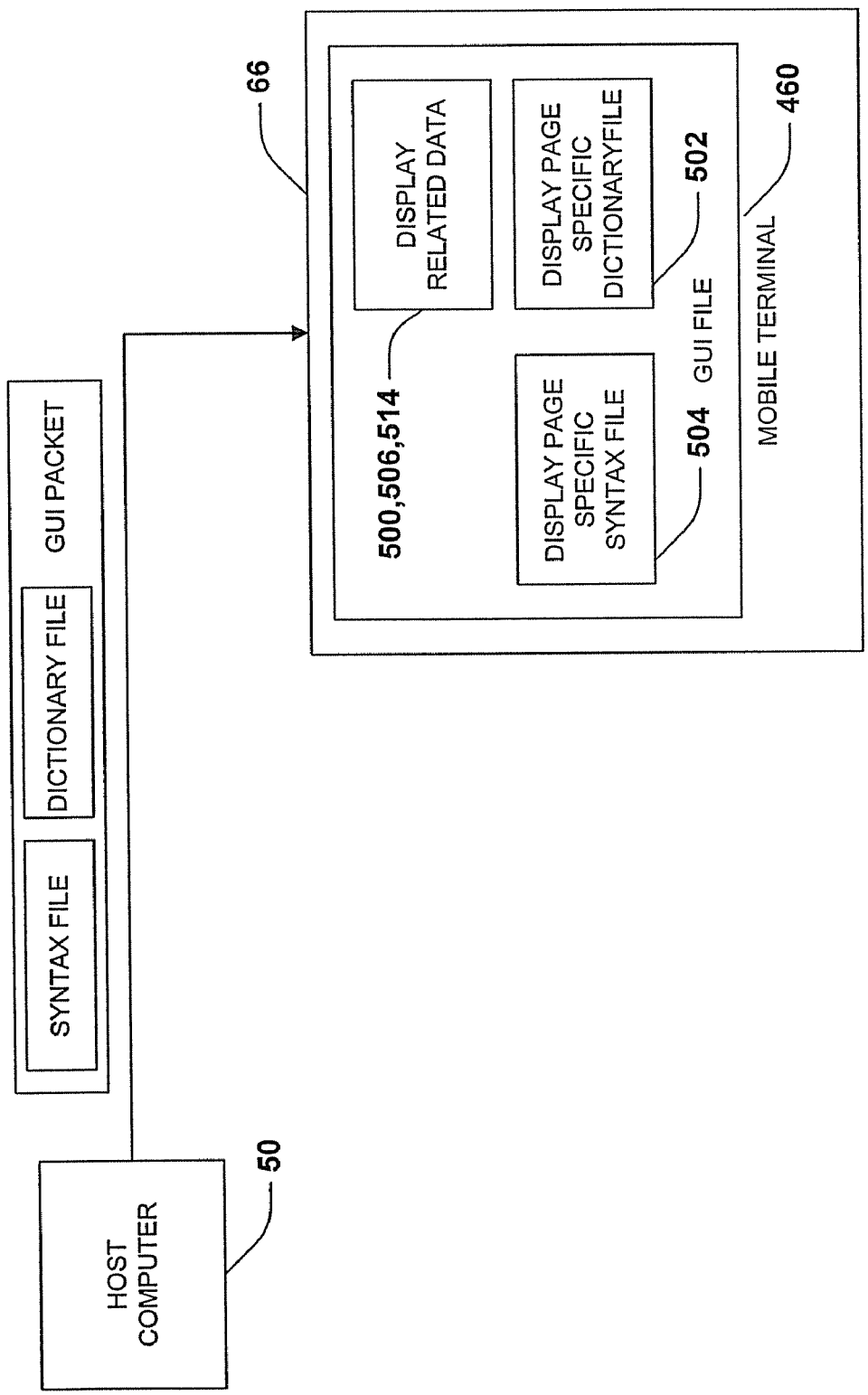

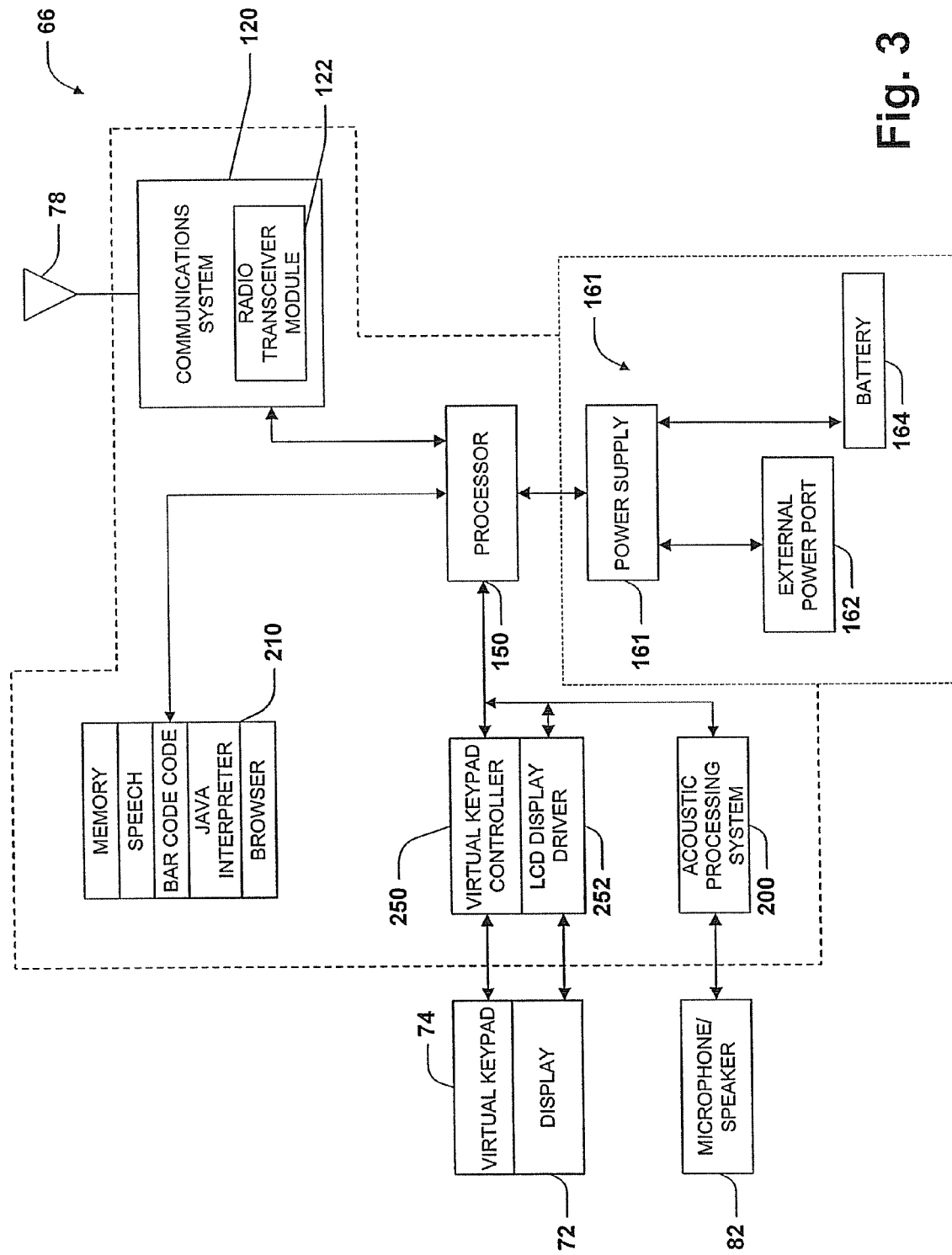

SPEECH RECOGNITION SYSTEM AND METHOD FOR EMPLOYING THE SAME

CROSS-REFERENCE TO RELATED APPLICATIONS

This application is a continuation of U.S. patent application Ser. No. 09/057,261, filed Apr. 8, 1998, entitled "SPEECH RECOGNITION SYSTEM AND METHOD FOR EMPLOYING THE SAME", which is a continuation-in-part of U.S. patent application Ser. No. 08/699,632, filed Aug. 19, 1996, entitled "SPEECH RECOGNITION MANAGER", now issued as U.S. Pat. No. 5,867,817. The entireties of the aforementioned applications are incorporated herein by reference.

TECHNICAL FIELD

This invention relates generally to a speech recognition system and method for employing the same.

BACKGROUND OF THE INVENTION

Speech decoding systems are known and widely used. However, conventional speech decoding systems are limited in their applicability due to the enormous amount of processing demands placed on such conventional systems and/or the user specific nature of some of these systems.

More particularly, many conventional speech decoding systems include an acoustic processing circuit for converting to a digital electrical signal, a spoken utterance (e.g. speech in the form of a word, phrase or sentence, as picked up by a microphone). Some of these systems utilize a phonetic encoder to convert the digital signals representing the utterance into a sequence of phoneme codes. Each phoneme is the smallest unit of speech that can be used to distinguish one sound from another. The sequence of phoneme codes is decoded into a literal string of words using a phonetic dictionary and a syntax file. The phonetic dictionary correlates phoneme code sequences to words. The syntax file contains a number of production rules that define an allowable grammatical structure and limit the words that can be recognized in different parts of the grammatical structure.

The use of the syntax file increases the efficiency of the phonetic decoding process. However, systems employing such still have problems with both speed and accuracy due to the large size of the syntax file employed. In other words, the speed and accuracy of the system decreases as the size and complexity of the syntax file increases.

Another type of speech decoding system utilizes a template matching algorithm that compares a digital representation of an aural signature (e.g., analog waveform representation of detected speech) to a database of word signatures and selects the closest match. This type of system requires unnatural pauses between words so that the system can distinguish when a word begins and ends. This system also requires an intended user to speak the same words repeatedly so that the system can obtain numerous waveform samples representing the same word. Not only is this process extremely time-consuming and tiresome, but it also makes the system user specific. Furthermore, like most other prior speech decoding systems as the size of the database increases errors in decoding occur more frequently and the speed of this system decreases.

Thus, the aforementioned speech decoding systems are generally not suitable for employment in communication systems having wireless mobile communication units which communicate using an optical or radio link with a hardwired network, such as a local area network (LAN). More specifically, market forces are requiring that these wireless mobile communication units become smaller, lighter and be faster in response to user inputs. Consequently, space is at a premium in such devices as well as the amount of data that must be processed by such devices in order to maximize response time to a user input and battery life.

Retail stores and warehouses, for example, may use such communication systems to track inventory, replenish stock or provide for efficient customer shopping (e.g., in a grocery store). Customers may enter and retrieve information using the mobile communication units which can be carried through the store. In manufacturing facilities, such systems are useful for tracking parts, completed products and defects. In a medical environment, these systems can reduce the time needed to fill out forms and eliminate inaccuracies by allowing medical personnel to transmit data directly from a mobile communication unit carried by the medical personnel.

However, the aforementioned speech decoding systems are not suitable for employment in such wireless communication systems largely because of the extensive data processing required by such systems. Moreover, in a wireless communication system it is often desired for the mobile communication units to be used by a number of individuals (e.g., different shoppers). Therefore, speech decoding systems which need to be trained to recognize a particular user's speech patterns (e.g., user specific) are not appropriate for mobile communication units which may be used by numerous individuals.

Thus, there is a strong need in the art for a speech decoding system which has low data processing requirements and may be used by numerous individuals so as to be suitable for use in a communication system using mobile communication units.

SUMMARY OF THE INVENTION

The present invention relates to a speech recognition system and method for employing the same. The speech recognition system of the present invention mitigates many of the problems associated with conventional systems, and as a result is suitable for employment in a communication system using mobile communication units (mobile terminals).

The speech recognition system performs speech decoding at the mobile terminal as compared to a host computer. By performing such decoding at the mobile terminal efficient RF bandwidth utilization is realized. Furthermore, the mobile terminal employs virtual Graphical User Interface (GUI) pages to facilitate user interface. GUI files corresponding to particular screens are provided to the mobile terminal from the host computer in accordance with a particular file transfer protocol. Associated with each GUI file is an Hypertext Markup Language (HTML) file, dictionary file which includes corresponding speech recognition identifying data (e.g., phenome files) and a syntax file. The dictionary files and syntax files are limited in scope to provide for identification of commands associated primarily only with the particular GUI file. In other words, a display associated with a particular GUI file will have commands associated therewith. The dictionary file that is attached to a particular GUI file and corresponds to an associated HTML file will contain phenome sequences for example that provide for identifying speech corresponding to the particular display associated with the GUI file. Likewise, the syntax file will include production rule sequences limited primarily to those which represent allowable patterns of words looked for in a literal string of phenome sequences representing a spoken utterance.

Thus, the present invention affords for greatly reducing processing and memory requirements because the dictionary file(s) and syntax file(s) available for use by the present speech recognition system are limited to words associated with the limited permutation of commands and data which a user of the mobile terminal could validly input in connection with a particular GUI file. All other utterances by the user would not be recognized, nor would processing time be spent attempting to recognize or decode utterances which would normally be associated with a particular GUI file. The recognized utterances would be acted upon by the speech recognition system so as to carry out a function, request, command, etc. associated therewith.

The present invention therefore provides for a speech recognition system which is highly suitable for employment in a communication system utilizing wireless mobile terminals where speed of processing, memory requirements communications bandwidth, component complexity, etc. are at a premium.

One specific embodiment of the present invention is in connection with a worker at a retail store. At the store, the worker can use a mobile terminal in accordance with the present invention to take inventory, change product prices, check product prices, check promotions, etc. and execute many of these functions via voice commands. In other words, the worker can identify himself/herself to the mobile terminal and operate the mobile terminal by either manually inputting data or employing the speech recognition system of the present invention to enter data, responses and/or commands via speech.

More particularly, the mobile terminal may initially display via a GUI file a web page relating to worker identification, for example. Associated with the GUI file are a corresponding dictionary file and syntax file for recognizing utterances from the worker relating to worker identification. The worker will utter the identification information and the speech recognition system will process the utterance as if the identification information was manually input. The speech recognition is performed at the mobile terminal wherein the uttered speech will be transformed to data, functions and/or commands which are subsequently processed by a remote host computer. After processing a first data set, the host computer will send to the mobile terminal a second web page (e.g., GUI file) which corresponds to the processed first data set.

The second web page will have associated therewith a corresponding dictionary file and syntax file to facilitate speech recognition of utterances corresponding to the second web page. In this manner, the speech recognition system of the present invention facilitates the worker performing his/her job functions. The mobile terminal will be able to rapidly decode utterances by the worker in connection with a particular display because the dictionary file and syntax file related thereto are display page specific and/or application specific. Furthermore, since the speech recognition is performed at the mobile terminal communication bandwidth is utilized efficiently. Moreover, since the dictionary file and syntax file are display page specific only a relatively small set of utterances are decoded thus affording for highly accurate speech recognition.

According to one specific aspect of the present invention, a speech recognition system is provided. The system includes a host computer which is operative to communicate at least one graphical user interface (GUI) display file to a mobile terminal of the system. The mobile terminal includes a microphone for receiving speech input; wherein the at least one GUI display file is operative to be associated with at least one of a dictionary file and syntax file to facilitate speech recognition in connection with the at least one GUI display file.

Another aspect of the present invention provides for a mobile terminal having speech recognition capabilities. The mobile terminal includes a processor; a display operatively coupled to the processor, the display adapted to display at least one graphical user interface (GUI). The mobile terminal also includes a speech recognition system for identifying speech commands from a user, the speech recognition system being operative to employ a dictionary file and syntax file associated with the GUI file to map sequences of phenomes to operator instructions; wherein the scope of speech recognition associated with the dictionary file and syntax file are substantially focused to recognizing utterances which correspond to valid inputs to the at least one graphical user interface (GUI) file so as to minimize data processing requirements of the mobile terminal.

Yet another aspect of the present invention provides for a method for facilitating speech recognition associated with a graphical user interface (GUI). The method includes a step of using at least one GUI display file of a plurality of GUI display files to input commands to a unit, the unit being adapted to receive input commands via speech. The method further includes the step of using at least one of a dictionary file and syntax file in connection with the at least one GUI display file, the dictionary file and syntax file including reference data corresponding to commands that may be input to the unit via speech. The reference data facilitates speech recognition in connection with the at least one GUI file.

Still another aspect of the present invention provides for a data collection network including a host computer for performing general operations in connection with the network. The host computer includes means for sending a graphical user interface (GUI) file to a remote client. The GUI file including display data for prompting an operator to input at least one of a command and data from a limited set of commands and data that may be input via a web page corresponding to the GUI display file. The GUI further includes utterance recognition data for recognizing a limited quantity of utterances associated with the limited set of commands and data that may be input via the web page. The network further includes a remote client operative to receive the GUI file from the host computer system, the remote client including a microphone for receiving operator utterances, and a memory for storing the GUI file. The remote client further includes an utterance recognition system which employs the utterance recognition data to facilitate speech recognition of utterances relating to the GUI file.

In accordance with another aspect of the present invention is a remote client computer which is operative to receive a graphical user interface (GUI) file from a remote host computer, the GUI file including display data for prompting a user to input at least one of a command and data. The GUI file further includes utterance recognition data which facilitates speech recognition of a limited quantity of utterances associated with a limited set of commands and inputs that can be input to a display generated from the GUI file.

Still yet another aspect of the present invention provides for a graphical user interface (GUI) file operative to be transmitted from a first device to a second device. The GUI file includes an HTML file for facilitating generation of a web page display on the second device; and at least one of a dictionary file and a syntax file to facilitate speech recognition of utterances made to the second device. The contents of the dictionary file and syntax file are specific to recognizing valid utterances in connection with the web page display.

Another aspect of the present invention provides for a data collection network including: a host computer operating a data collection application manipulating data received from a plurality of mobile computing devices; a mobile computing device operating a data collection application generating a plurality of graphical display contexts prompting user data input and associating with each graphical display at least one of a dictionary file and a syntax file including reference data corresponding to at least one of a limited permutation of data and commands which may be input via speech in each context and transmitting data to the host.

To the accomplishment of the foregoing and related ends, the invention, then, comprises the features hereinafter fully described and particularly pointed out in the claims. The following description and annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 2b is a block diagram of a host computer transmitting a GUI file to a mobile terminal in accordance with the present invention;

FIG. 3 is a schematic representation of selected modules and circuitry of a mobile terminal in accordance with the present invention;

DETAILED DESCRIPTION OF THE PREFERRED EMBODIMENT

Figure 1:
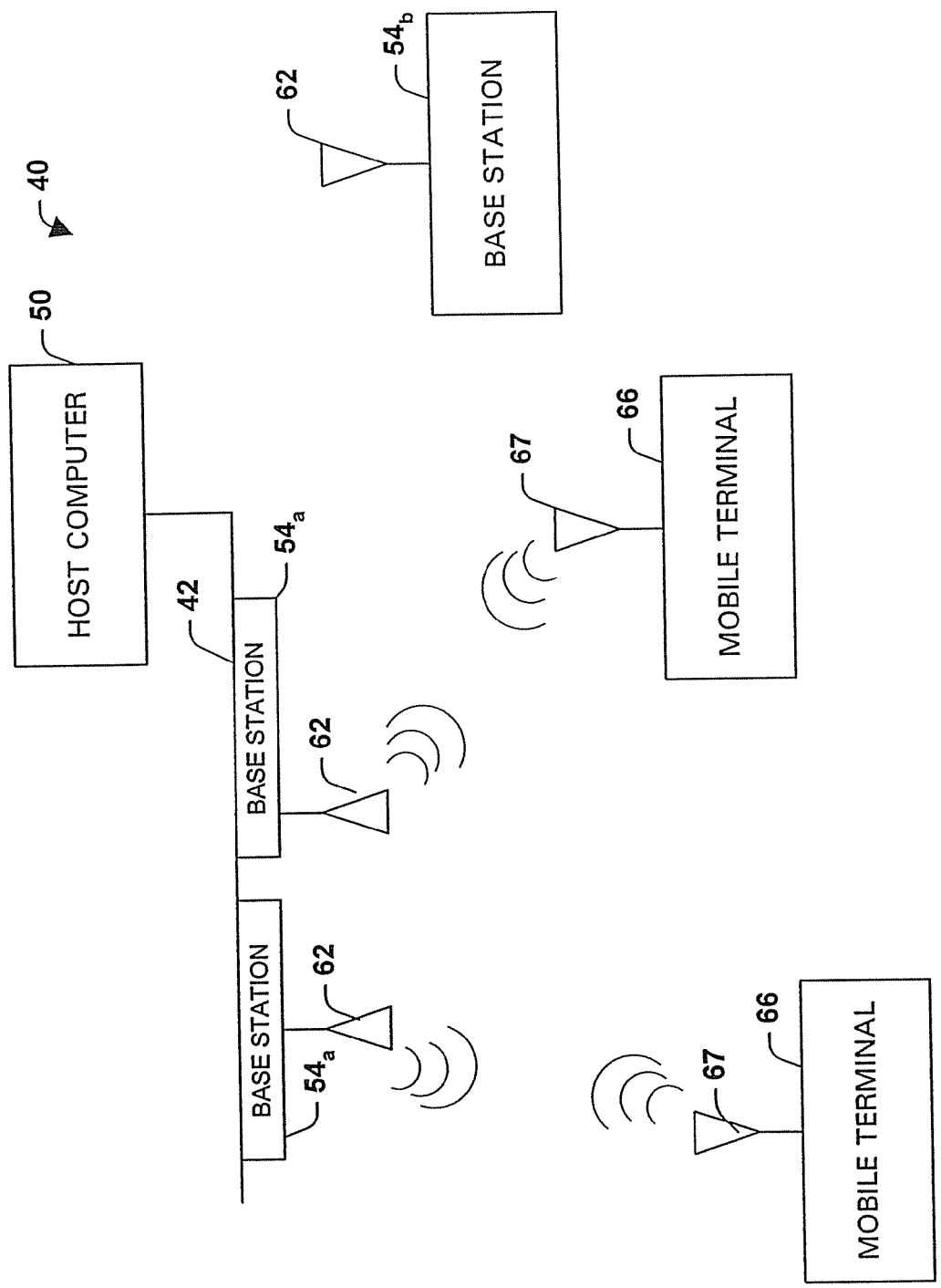
FIG. 1 is a block diagram of a communication system employing a speech recognition system in accordance with the present invention.

The present invention will now be described with reference to the drawings wherein like reference numerals are used to refer to like elements throughout. As mentioned above, the present invention relates to communication systems which include mobile terminals that can roam from cell to cell. Such mobile terminals can be data terminals, telephones, pagers, customer information terminals, inventory devices, etc. In the exemplary embodiment described hereinafter, the mobile terminal is used to communicate data such as inventory or the like. However, it is recognized that the invention contemplates other types of mobile devices and is not intended to be limited to systems using mobile terminals.

Referring now to FIG. 1, a communication system 40 is shown in accordance with an exemplary embodiment of the present invention. The communication system 40 includes a network backbone 42. The network backbone 42 may be a hardwired data communication path made of twisted pair cable, shielded coaxial cable or fiber optic cable, for example, or may be wireless or partially wireless in nature. Coupled to the network backbone 42 is a host computer 50 and several base stations 54. Only two base stations 54a are shown hardwired to the network backbone 42, however, it is understood that more than two hardwired base station 54a may be physically connected to the network backbone 42. The base stations 54 may be hardwired to the network backbone 42 such as base stations 54a or may wirelessly couple to the backbone 42 such as base station 54b. Each base station 54 serves as an entrance point through which wireless communications may occur with the network backbone 42. The wireless base station 54b may be employed to expand the effective communication range of the communication system 40. As is conventional, each wireless base station 54b associates itself, typically by registration, with another base station or the host computer 50 coupled to the network backbone 42, whether hardwired or wireless, such that a link is formed between itself and other devices situated on the network backbone 42.

Each base station 54 is capable of wirelessly communicating with other devices in the communication system 40 via respective antennas commonly denoted by reference numeral 62. The antenna 62 for any particular device may be of any type suitable for use in a network cellular communication system, such as an omni-directional antenna, a yagi-type antenna, etc. A geographic cell (not shown) associated with each base station 54 defines a region of coverage in which successful wireless communications may occur. Depending on the type of antenna 62 selected and output power of the respective base station 54, the geographic cell may take one of several different forms and sizes. For example, the antenna 62 could be an omni-directional antenna if a generally spherical cell area of coverage is desired. A directed yagi-type antenna could be used as the antenna 62 for a more directed elliptical cell area of coverage.

The communication system 40 also includes one or more mobile communication units 66. The mobile communication units 66 each include an antenna 67 for wirelessly communicating with other devices. Each mobile communication unit 66 communicates with devices on the network backbone 52 via a selected base station 54 and/or with other mobile communication units. Upon roaming from one cell to another, the mobile communication unit 66 is configured to associate itself with a new base station 54 or directly with the host computer 50 if within range. A mobile communication unit 66 registers with a particular base station which provides the particular mobile communication unit with wireless access to the network backbone 42.

The present invention advantageously makes use of standard Internet protocols including TCP/IP and HTTP. TCP/IP is a common transport layer protocol used by a worldwide network of computers. HTTP is a known application protocol that provides users access to files (which can be in different formats such as text, graphics, images, sound, video, etc.) using a standard page description language known as Hypertext Markup Language (HTML). Known HTML web browsers allow for graphical user interface (GUI) based access to HTML documents accessible on servers communicatively linked to the client. These documents are commonly referred to as "web pages".

Figure 2A:
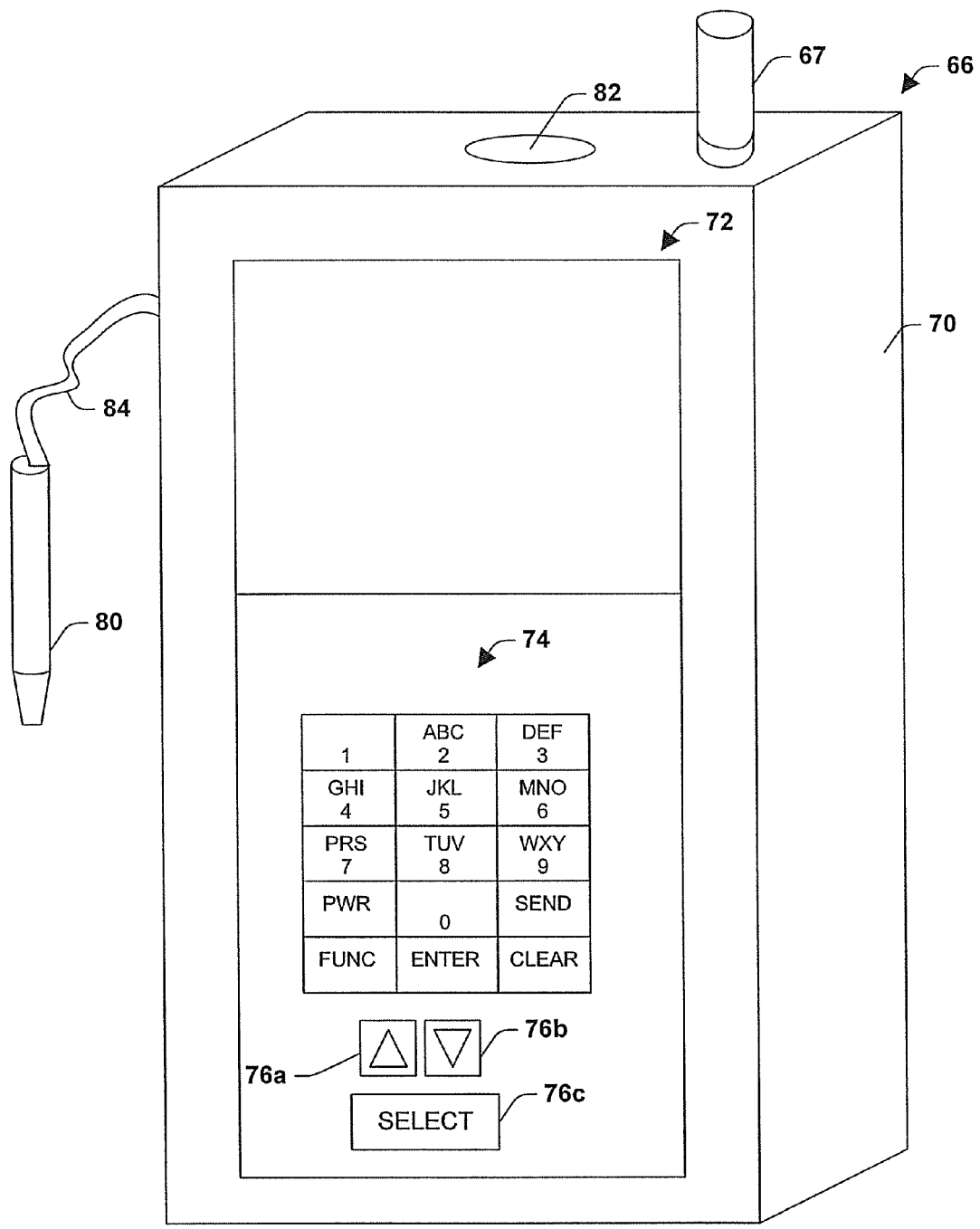
FIG. 2a is a perspective view of a mobile terminal in accordance with the present invention.

Before discussing the operation of the communications system 40 in accordance with the present invention, a description of the major components is provided. FIG. 2a shows a perspective view of the mobile terminal 66 in accordance with the present invention. The mobile terminal 66 includes a housing 70 which is preferably made of metal, high strength plastic, or the like. Protruding from the bottom side of the housing 70 are mounting clips (not shown). The mounting clips afford for firmly mounting the mobile terminal to a person, device (e.g., a shopping cart) or wall. Accordingly, the mobile terminal 66 may be mounted in any of a variety of manners suitable for preventing dislodgement of the mobile terminal 66 from a desired location. The housing 70 is adapted for easy disassembly to accommodate repair and replacement of parts such as batteries or lights for example. Of course, it is to be appreciated that the mobile terminal 66 is hand held portable.

The mobile terminal 66 includes a display 72 such as a liquid crystal display (LCD) or the like. As is conventional, the display 72 functions to display data (graphical and/or textual data) or other information relating to ordinary operation of the mobile terminal 66. For example, software operating on the mobile terminal 66 may provide for display pricing information, inventory detail, etc. to a user on the display 72. Additionally, the display 72 may display a variety of functions that are executable by the mobile terminal 66. In the preferred embodiment, the display 72 displays graphics based alpha-numerical information such as, for example, the price of a product. The display 72 also provides for the display of graphics such as icons representative of particular products, for example. The display 72 is controlled by electronic circuitry within the mobile terminal 66 and the remote host computer 50 which processes much of the data input to the mobile terminal 66. As will be discussed in greater detail below, most of the visual information communicated from the display 72 is accomplished via employment of web pages using GUI files having HTML file(s), dictionary file(s) and syntax file(s) attached thereto. The HTML file(s) generally provide for the graphical and linking aspects of the web page. HTML technology is well known in the art and further discussion related thereto is omitted for sake of brevity. The dictionary file(s) and syntax file(s) facilitate speech recognition of utterances relating to input commands/responses for a respective web page.

The mobile terminal 66 further includes an operator input device 74 in the form of a virtual keypad that is part of the web page being displayed which enables a user to enter data, information, function commands, etc. as is conventional. For example, the user may input information relating to inventory via the virtual keypad 74 for subsequent transmission to a base station 54. In addition, the virtual keypad 74 includes up and down cursor keys 76a and 76b, respectively, for controlling a cursor which may be shown on the display 72. By selectively pressing the up and down cursor keys 76a and 76b, the user is able to move the cursor about the display 74. Furthermore, the virtual key pad 74 includes a select key 76c for selecting an item or function designated by the cursor. Alternatively, a physical keypad not part of the display 72 may be employed to manually enter data.

The mobile terminal 66 also includes a bar code reader 80 in the form of a wand or the like which allows information to be input to the mobile terminal 66 via bar code symbols. The bar code reader 80 is coupled to the housing 70 by a cable 84 which provides the appropriate electrical connections between the bar code reader 80 and the circuitry contained in the housing 70.

The mobile terminal 66 also includes a microphone/speaker 82 for providing audial information to a user and affording for a user to input commands/data to the mobile terminal 66 via speech rather than manually inputting the commands. Extending from the housing 70 is the antenna 67 for transmitting and receiving radio signals within the communication system 40. In the exemplary embodiment, the antenna 67 is an omnidirectional antenna but other types of suitable antennas may be employed to carry out the present invention.

FIG. 2b illustrates the host computer 50 transmitting a GUI file 460 (see FIG. 6) via packet format (see FIG. 7) to the mobile terminal 66. As noted above, conventionally a mobile terminal would store a syntax file, phoneme file and dictionary file that are comprehensive enough to decode almost any utterance from a user. In order to accomplish such comprehensive decoding the syntax file and dictionary file of the conventional system needed to contain a enormous amount of rules and terms respectively which required substantial memory space. Furthermore, the conventional system when processing an utterance would need to process through the entire term and rule set in order to perform the decoding. A substantial amount of time and processing capabilities is required to accomplish this, which resulted in the conventional system being slow and expensive thus not being suitable for a mobile terminal in a wireless communication network.

However, as shown in FIG. 2a in the present invention the mobile terminal does not need to store the large, highly processing intensive syntax and dictionary files of conventional systems. Rather, the host computer 50 sends a GUI file 460 (FIG. 6) which has attached thereto syntax file(s) 504 (FIG. 6) and dictionary file(s) 502 (FIG. 6) that are specific in there content to facilitate decoding primarily only utterances made by a user associated with a display generated from the GUI file 460. As a result, speech recognition by the mobile terminal is effected quickly and with much less processing requirements than conventional systems.

Referring now to FIG. 3, a block diagram of the mobile terminal 66 is shown. The mobile terminal 66 includes a communications system 120 for communication with a base station 54 and thereby communication with the host computer 50 via a wireless local area network. The communications system 120 includes an RF transceiver module 122 for wirelessly communicating with the base stations 54. The communications system 120 may also include optical communication means (e.g., an infra red communication system).

The RF transceiver module 122 may be embodied in a PCMCIA card for example. The RF transceiver module 122 is coupled to the antenna 67 which is shown extending through an opening in the upper surface of the housing 70 (FIG. 2). Alternatively, the antenna 67 may be suitably disposed inside the housing 70.

The mobile terminal 66 includes a processor 150 which is responsible for controlling the general operation of the mobile terminal 66. The processor 150 is programmed to control and operate the various components within the mobile terminal 66 in order to carry out the various functions described herein. The processor or CPU 150 can be any of a plurality of processors, such as the p24T, Pentium 50/75, Pentium 60/90, and Pentium 66/100, Pentium PRO and Pentium 2, and other similar and compatible processors. The manner in which the processor 150 can be programmed to carry out the functions relating to the present invention will be readily apparent to those having ordinary skill in the art based on the description provided herein. Coupled to the processor 150 is a power supply system 160 which is responsible for delivering power to the mobile terminal 66. The power supply system 160 includes a power supply 161 which is coupled to an external power supply port 162 for connecting to an external power supply 162 for charging a battery 164.

The microphone/speaker 82 is coupled to the processor 150 via an acoustic processing system 200 which preferably includes a digital signal processor (DSP). The microphone/speaker 82 serves to provide the user with audial information as is conventional and receive speech input from the user. The speech recognition system of the present invention is primarily implemented by the microphone/speaker 82, the acoustic processing system 200 and the processor 150. The acoustic processing system 200 operates in accordance with software and fixed data stored in a read only memory (ROM) that makes up a portion of the memory 210. A random access memory (RAM) is also part of the memory 210 and provides scratch pad memory and is used to store data that may be changed. Other memory configurations that utilize EEPROMs or the like may also be utilized as should be apparent. The acoustic processing system 200 receives inputs from the microphone/speaker 82 and converts a spoken utterance (e.g., speech in the form of a word, phrase or sentence) picked up by the microphone/speaker 82 to a digital signal. The digital signal is then processed by the processor 150 so as to decode the speech utterance of the user as will be described in significantly greater detail below.

As noted above a phoneme is the smallest unit of speech that can be used to distinguish one sound from another. A sequence of phoneme codes may be decoded into a literal string of words. The present invention employs a web page specific dictionary file to correlate phoneme files (including phoneme code sequences) to words that are associated with the particular GUI file. The phenome files contain a number of production rules that define an allowable grammatical structure and limit the words that can be recognized in different parts of the grammatical structure. The phenome files utilize intermediate labels or parse tags wherein the phenome files include information correlating an utterance to parse tags and/or literal word strings. A parse tag identifies a category of words grouped according to meaning and grammatical or syntactical structure. For example, the parse tag "writing tool" may identify a category of words or utterances including "pen, pencil, marker, . . . " A parse tag sequence is a sequence or pattern of one or more parse tags defining grammatical or syntactical structure. An example of a parse tag sequence is: "writing action; writing tool," where "writing tool" is the parse tag discussed above and "writing action" is a parse tag that identifies the utterances "pick up, drop, sharpen, . . . " This parse tag sequence defines the grammatical structure for the phrase "sharpen the pencil". In operation, the phonetic stream is analyzed to identify the syntactical or grammatical structure of the phoneme code sequence by matching the phoneme code sequence with one or more grammatical production rules stored in the syntax file to provide a basis for the possible phoneme code to utterance matches. The output of the speech decoding system is both a literal string corresponding to the decoded utterance such as "sharpen the pencil" plus the grammatical structure used in the decoding process including the production rules, parse tags, etc.

The present invention mitigates many of the problems associated with speed and accuracy of conventional speech decoding systems where extremely large syntax files are employed. Since in the present invention dictionary file(s) and syntax file(s) are specific to a given GUI file the amount of phenomic data and rules stored therein is relatively small. In other words, the dictionary file and syntax file only needs to store sufficient amount of phenomic data and rules respectively to provide for speech recognition in connection with the associated web page.

The syntax file defines a search so that what is searched for are words and sentences reasonably expected based upon a set of grammatical production rules. More specifically, the syntax file defines a production rule sequence which represents allowable patterns of words looked for in the literal string of a phoneme sequence representing a spoken utterance. The production rules utilize parse tags which are intermediate labels used in the decoding process wherein one or more production rules correlate spoken utterances to parse tags and/or literal word strings.

When implemented, the speech recognition system of the present invention generates data representing a literal string of words, this literal string representing the decoded utterance picked up by the microphone 82. In addition to the literal string representing an utterance and other information the parse tags associated with the utterance are generated. These representations of one or more words (e.g., literal text strings representing utterances and parse tags), are utilized by the speech recognition system to accurately assign a meaning or input command to the utterance for transmission to the host or use at the host for a scriptive language application such as a JAVA applet.

The speech recognition system of the present invention is also useful in an environment wherein an application program running on the mobile terminal 66 generates each user interface display and commands and data input by an operator are appropriately used by the local application and/or transmitted to the host computer 50 for operation of the host application. An example of this may be an inventory application running on the host computer 50 wherein the application updates various inventory files in accordance with data transmitted by a plurality of mobile clients 66. The mobile terminal 66 may be running an application that generates displays prompting the operator to input data regarding product flow through a facility. The input product data is used by the local application to appropriately modify the display to prompt the operator to input more data and the data is transmitted to the host computer 50 for use by the host application. The display that the operator sees and the particular environment that the operator is working in (for example the receiving dock or the shopping dock) can generically be considered the context. The context may change based on passage of time, data transmitted from the host computer 50, or operator input of data or commands. The context may change entirely or it may change incrementally. The context may also be considered changed based on the cursor position within the display.

The speech recognition system of the present invention determines a current context state of interactive communications with the user to assign different meanings to the same spoken word used in different context states. This is based on a recognition that the same word or words in different contexts to have completely different meanings and to illicit different responses from a listener or device. Because the speech recognition system of the present invention does account for changes in the context of communications with the user, the speech recognition system can very accurately recognize spoken utterances so as to assign the correct meaning, commands, data or other to those utterances. Furthermore, because the speech recognition system limits the grammar or syntax as well as the vocabulary of words recognized thereby in a given context the present invention is much more flexible, adaptable, scalable and formal than prior art systems.

The context interpretation is implemented by the microprocessor 150 which utilizes data stored in the memory 210 for a number of different context states. When implemented, the microprocessor 150 (based on a current context state) would be responsive to the data stored in the memory 210 by assigning to a received word representation, one meaning represented by a first input command when the current context state is determined to be a first context state and for assigning a different meaning represented by a second input command to the same word representation when the current context state is determined to be a second context state.

More particularly, the context recognition aspects of the present invention may be employed for example when the mobile terminal 66 may display the same display but is being used in completely different environments, for example, the shipping dock or the receiving dock. Because the environment in which the mobile terminal is employed may play a significant role in the implementation and use of the mobile terminal taking into consideration the context in which the user utterance is made facilitates accurate speech recognition.

For example, an initial display on the mobile terminal 66 may prompt the user to define an environment (e.g., shipping or receiving) the mobile terminal 66 is employed in. The microprocessor 150 based on the environment (context state) would assign one meaning to a word representation if the mobile terminal 66 is being used in the shipper environment and another meaning if the same word representation is being used in the receiving environment.

Alternatively, context analyses can be accomplished in a reverse manner. For example, if a phoneme file is associated with a particular JAVA applet 506 or other local application program certain sequences may map to different commands depending on what part of the program is being executed at a particular time. Thus, by the processor 150 recognizing what part of the program 506 is being executed a particular phoneme sequence can be mapped to the appropriate command or data input.

The data stored in the memory 210 for use by the microprocessor 150 in context state analysis includes for each of a number of context states, one or more data tables correlating word representations to input commands. In one embodiment of the present invention utilizing a syntax file, the data stored for each context state includes a syntax table or file containing a set of grammatical production rules including information correlating word representations in the form of utterances to word representations in the form of parse tags for that particular context state. Also stored for each context state is a second file or data table referred to as a meaning map that correlates word representations in the form of a sequence of one or more parse tags and/or literal text strings representing an utterance to an input command or data. The memory 210 also stores, for each context state, data correlating at least one word representation in the form of a parse tag sequence or utterance to a context state transition input command. Each context state may have one or more context state transition input commands associated therewith so as to cause a change from that context state to a different context state as discussed below.

Because a new syntax file is loaded into the speech recognition system each time the context state has been changed, the syntax file utilized by the speech recognition system can be much smaller than the syntax files utilized in conventional systems.

As a result, of the focused speech recognition afforded by the present invention speed and accuracy are substantially improved over conventional systems.

Turning back to the discussion of the architectural aspects of the mobile terminal 66, the display 72 and the virtual keypad 74 are connected to and controlled by the processor 150 via display driver circuit 250 and keypad driver 252, respectively.

The memory 210 is tied to the processor 150 and provides for storing program code executed by the processor 150 for carrying out operating functions of the mobile terminal 66 as described herein. The memory 210 also serves as a storage medium for temporarily storing information such as pricing information, advertisements, inventory or the like received from or intended to be transmitted to the base stations 54 and/or host computer 50. The memory 210 is adapted to store a complete set of the information to be displayed. According to a preferred embodiment, the memory 210 has sufficient capacity to store multiple sets of information, and the processor 150 could include a program for alternating or cycling between various sets of display information. This feature enables the display 72 to show rolling, scrolling or animation effects. Furthermore, the memory 210 will include information such that the processor 150 can effect speech decoding; bar code decoding; a JAVA interpreter, a web browser, etc.

Figure 4A:
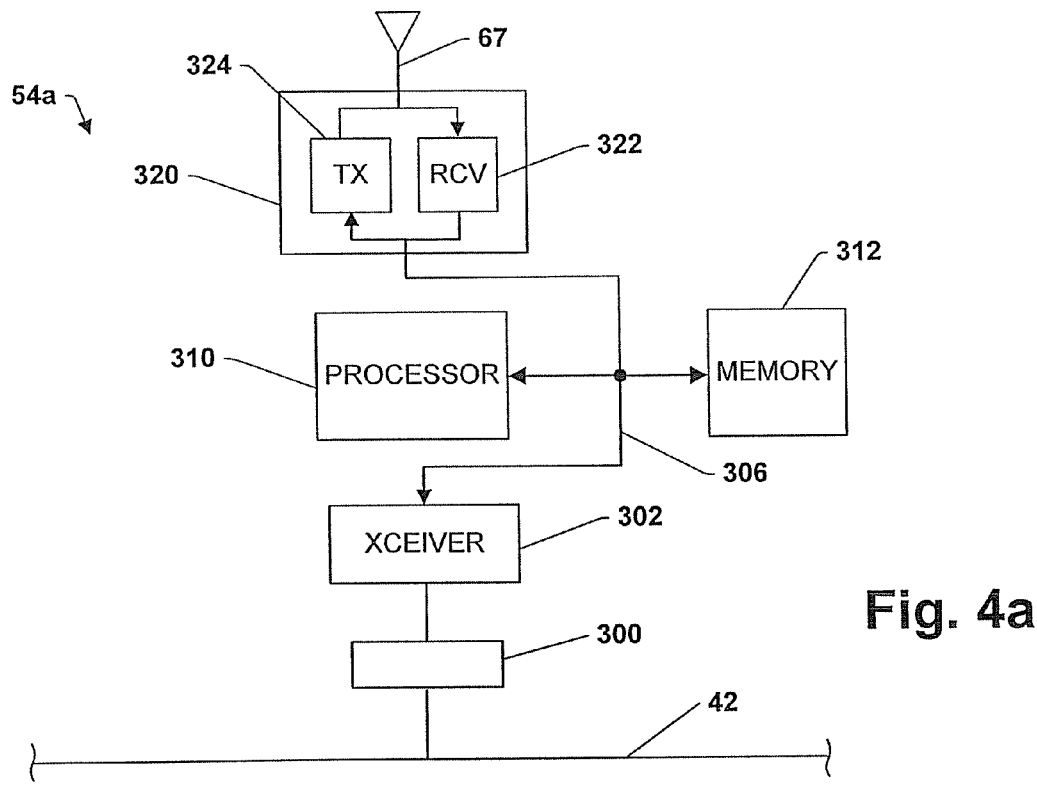
FIGS. 4a and 4b are schematic representations of selected modules and circuitry of base stations in accordance with the present invention.

FIG. 4a is a block diagram representative of each hardwired base station 54a. Each hardwired base station 54a is connected to the network backbone 42 via a connector 300 such as a DB-9 or RJ-45 connector. The connector 300 is connected to the network backbone 42 at one end and to a network adapter transceiver 302 included in the base station 54a at the other end. The network adapter transceiver 302 is configured according to conventional adapter transceiver techniques to allow the base station 54a to communicate over the network backbone 42. The network adapter transceiver 302 is also connected to an internal bus 306 included within the base station 54a. The base station 54a further includes a processor 310 connected to the bus 306 for controlling and carrying out the operations of the base station 54a. The processor 310 may include any of a variety of different microprocessors, such as the Motorola 68360 or Intel 80486 microprocessors. It is understood that any suitable processor capable of carrying out the herein described functions of the base stations 54a may be used and falls within the scope of this invention.

The base station 54a also includes a memory 312 connected to the bus 306 The memory 312 stores program code executed by the processor 310 for controlling the other elements within the base station 54a to carry out the functions described herein. It will be readily apparent to a person having ordinary skill in the art of microprocessor programming how to program the processor 310 to carry out the operations described herein using conventional programming techniques based on the flowcharts/flow diagrams and descriptions provided herein. Accordingly, additional detail as to the specific program code has been omitted. The memory 312 also serves to buffer packets of information such as those received over the network backbone 42 or those transmitted to or received from the mobile communication units 66 or wireless base stations 54b. Furthermore, the memory 312 may store tables relating to which of the mobile communication units 66 are registered to the network backbone 42 and/or the identification codes of the mobile communication units 66.

Also connected to the bus 306 is a radio frequency (RF) section 320 included in the base station 54a. The RF section 320 includes the aforementioned antenna 67 for receiving radio signals from and transmitting radio signals to mobile communication units 66 and wireless base stations 54b (FIG. 4b) within the cell area of the base station 54a. Information transmitted from a mobile communication unit 66 or a wireless base station 54*b* is received via the antenna 67 and is processed by an RF receiver 322 which is connected to the bus 306 and demodulates and decodes the signal and converts the signal to a digital signal having a packet format as discussed below in connection with FIG. 7. The processor 310 controls an RF transmitter 324 included in the RF section 320, the RF transmitter 324 also being connected to the bus 306. The processor 310 causes the RF transmitter 324 to modulate and transmit an RF signal which in turn carries the information packet (FIG. 7) to the appropriate mobile terminal or wireless base station 54*b*.

Figure 4B:
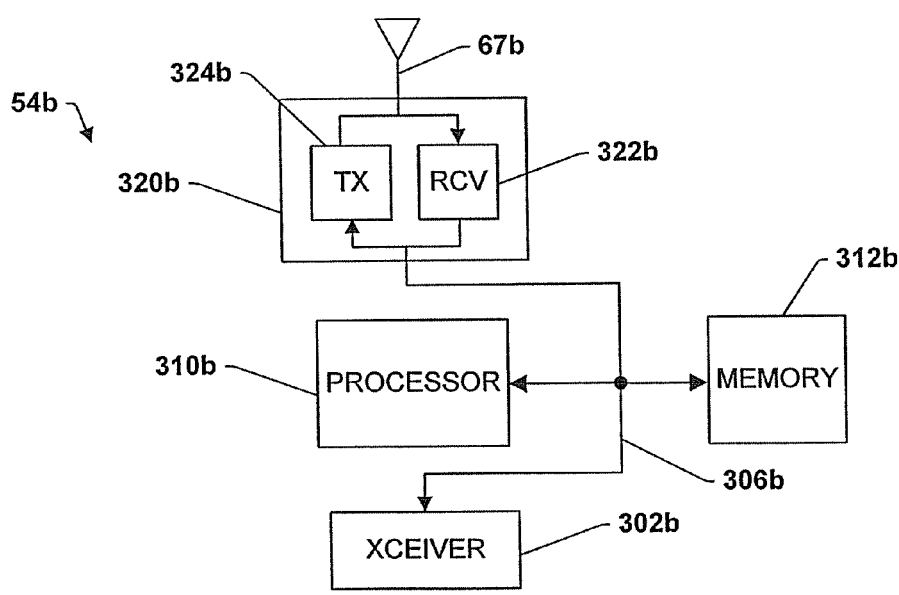

FIG. 4*b* is a block diagram representative of each wireless base station 54*b* in the system 40. For the most part, the construction and operation of the components within the wireless base station 54*b* are identical to those described with respect to the base stations 54*a*. Hence, similar components are denoted simply by the addition of a [b]. For example, the processor 310 in the base station 54*a* is equivalent to the processor 310*b* in the wireless base station 54*b*. However, the wireless base station 54*b* is not connected directly to the network backbone 42 and therefore does not include a network transceiver or connector as in each base station 54*a*. Rather, the wireless base station 54*b* communicates with mobile communication units 66 registered thereto and with the particular base station with which the wireless base station 54*b* is associated with via the RF section 320*b*. Operations of the two base stations 54*a* and 54*b* are primarily the same with the exception of the particular procedures described herein. As mentioned above, the wireless base stations 54*b* function to extend the relative cell coverage of a given base station 54*a*, and serve primarily to relay information between the base stations 54*a* connected to the network backbone 42 and the mobile communication units 66.

Figure 5:
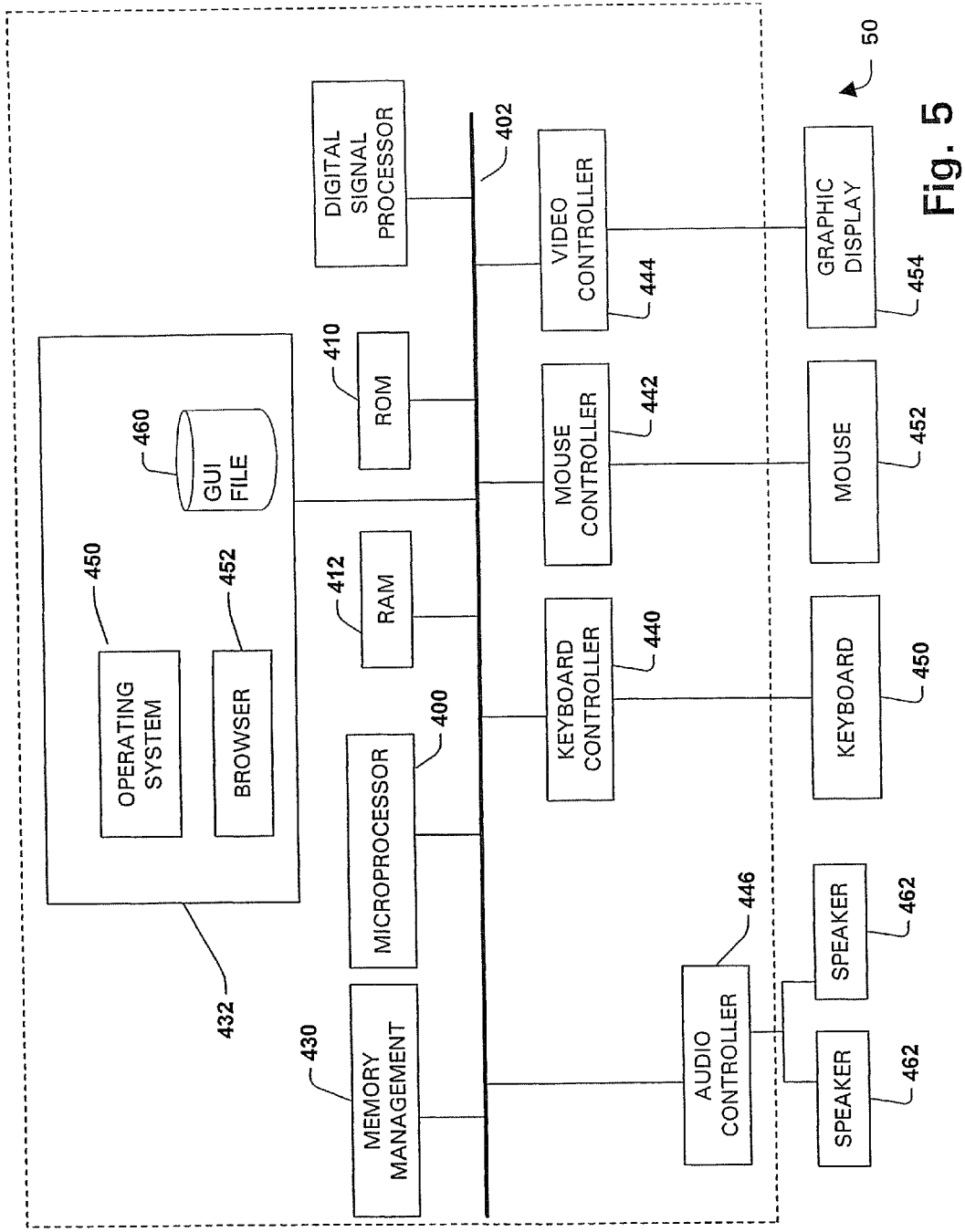
FIG. 5 is a schematic representation of selected electronic modules and circuitry of a host computer in accordance with the present invention.

FIG. 5 is a block diagram representative of the host computer 50 of the present invention. Although operations performed by the host computer 50 are conventionally different than the operations of a base station 54, the hardware components are similar to those hardware components described with respect to base station 54*a* in FIG. 4*a*. Unlike the base stations 54, however, the host computer 50 of this particular embodiment does not include an RF section. Thus, in order for the host computer 50 to communicate with any mobile communication unit 66, the host computer 50 must route all such communication over the backbone 42 and through one of the base stations 54. Similarly, for a mobile communication unit 66 to communicate with the host computer 50, the mobile communication unit 66 must first access the network backbone 42 through one of the existing base stations 54 which will then ensure the communication is properly delivered to the host computer 50. The host computer 50 serves as a central unit where large operational based and application based software programs are stored and executed in order to provide the necessary functions which the communication system 40 was installed to perform.

Turning now to the architecture of the host computer 50 in detail, the host computer 50 includes a processor 400 coupled to a system bus or plurality of system buses 402 to which various components are coupled and by which communication between the various components is accomplished. The processor 400 is supported by read only memory (ROM) 410 and random access memory (RAM) 412 also connected to the system bus 402. The ROM 410 contains among other code the Basic Input-Output system (BIOS) which controls the basic hardware/software operations of the host computer 50. The RAM 412 is the main memory into which the operating system and application programs are loaded. A memory management system 430 is connected to the system bus 402 and controls direct memory access operations including, passing data between the RAM 412 and memory 432. The memory 432 may be a hard drive for example, however, any suitable storage device may be employed. A CD ROM 436 also coupled to the bus system 402 may be used to store a large amount of data (e.g., multimedia program or large database).

The memory 432 provides for storing much of the data for carrying out the present invention. For example, the memory 432 stores an operating system 450 for the host computer 50, as well as a web browser 452 and GUI files 460 which provide for web page displays at the mobile terminal 66.

The operating system 450 of the computer may be DOS, WINDOWS3.x, WINDOWS '95, WINDOWS NT, OS/2, AIX, JAVA® or any other known and suitable operating system. The RAM 412 supports a number of Internet access tools including, for example, the HTTP-compliant web browser 452. Known software includes Netscape, Netscape Navigator, Mosaic, and the like. The present invention is designed to operate within any of these known or developing web browsers. The RAM 412 also supports other Internet services including simple mail transfer protocol (SMTP) or e-mail, file transfer protocol (FTP), network news transfer protocol (NNTP) or "Usenet", and remote terminal access (Telnet).

Figure 6:
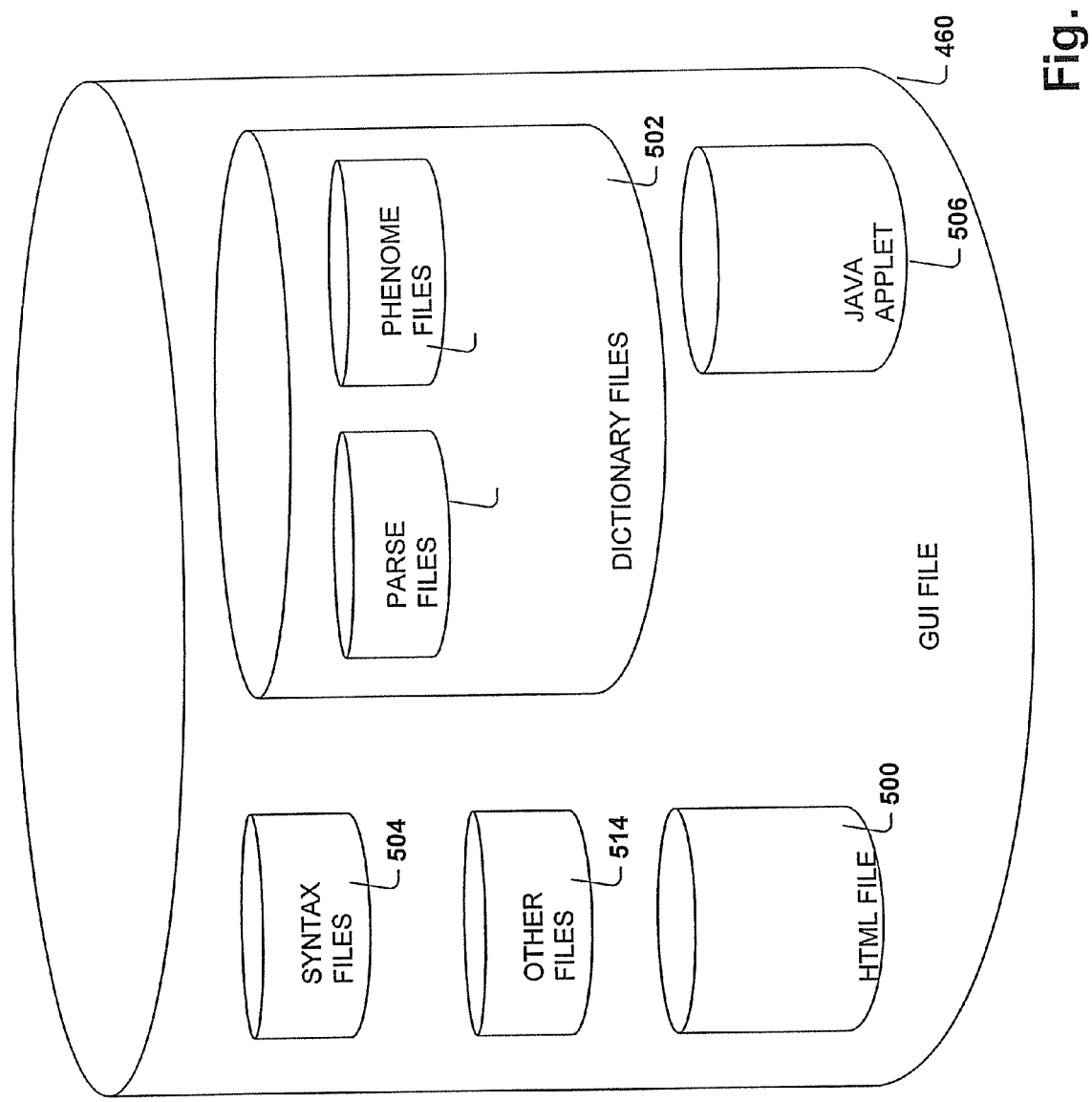
FIG. 6 is a schematic representation of a GUI file and associated files in accordance with the present invention.

The RAM 412 also provides for supporting the GUI files 460. As mentioned above, the GUI files 460 are a primary means for conveying visual and associated audio information to a user of the mobile terminal 66. FIG. 6 shows that the GUI file includes HTML files 500, corresponding dictionary files 502 and syntax files 504, JAVA applets 506 and other files 514 necessary to implement a web page associated with the GUI file 460. Each HTML file 500 has an associated dictionary file 502 and syntax file 504 which facilitate the processor 400 of the mobile terminal 66 in decoding utterances from a user in connection with a currently displayed GUI file 460. More specifically, each GUI file 460 (e.g., web page display) has certain commands, instructions, functions etc. associated therewith which have a relatively small set of corresponding voice input commands and responses. The HTML file(s) 500, dictionary file(s) 502 and the syntax file(s) 504 associated with a particular GUI file 460 are sent by the host computer 50 together in one packet to provide a particular displayed web page on the mobile terminal 66 of which utterances by a user in connection with the web page can easily be decoded in accordance with the speech recognition system as described herein.

Returning back to the discussion of the host computer 50 hardware, also connected to the system bus 402 are various I/O controllers: a keyboard controller 440, a mouse controller 442, a video controller 444, and an audio controller 446. The keyboard controller 440 provides the hardware interface for a keyboard 450, the mouse controller 442 provides a hardware interface for a mouse 452 (or other point and click device). The video controller 444 is the hardware interface for a display 454, and the audio controller 446 is the hardware interface for multimedia speakers 460 and 462.

Figure 7:
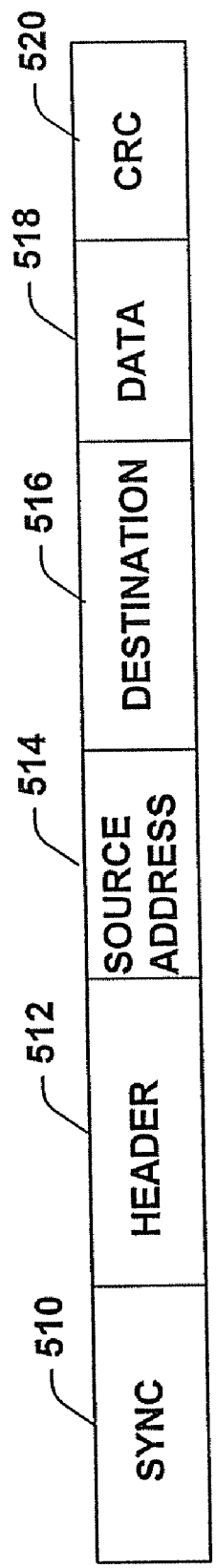
FIG. 7 is a schematic representation of a packet format in accordance with the present invention.

Referring briefly to FIG. 7 an exemplary format for packets sent from the host computer 50 to the mobile terminal 66 in the system 40 is shown. Each packet includes a number of fields such as a synchronization field 510, a header field 512, a source address field 514, a destination address field 516, a data field 518, and an error correcting field (CRC) 520, for example. The synchronization field 510 includes synchronizing bits which allows the mobile terminal 66 receiving the packet an opportunity to "sync" to the packet as is conventional. The header field 512 follows the synchronization field 510 and includes information such as the length and type of the packet. For example, the header field 512 may indicate whether the packet is a type which requires a response from the mobile terminal 66. The source address field 514 follows the header field 512 and includes an address of the device (e.g., host computer 50) from which the packet originated. Following the source address field 514, the packet includes a destination address field 516 which holds the address of the device (mobile terminal 66) to which the packet is ultimately destined. The data field 488 in the packet includes various information (e.g., GUI file which includes the HTML file(s) 500, dictionary file(s) 502, syntax file(s) and JAVA applets 506) intended to be communicated to the mobile terminal 66. The packet ends with a cyclical redundancy code (CRC) field 520 which serves as an error correcting field according to the conventional techniques such that a receiving device can determine if it has properly received the packet.

OPERATION OF THE SPEECH RECOGNITION SYSTEM

Figure 8:
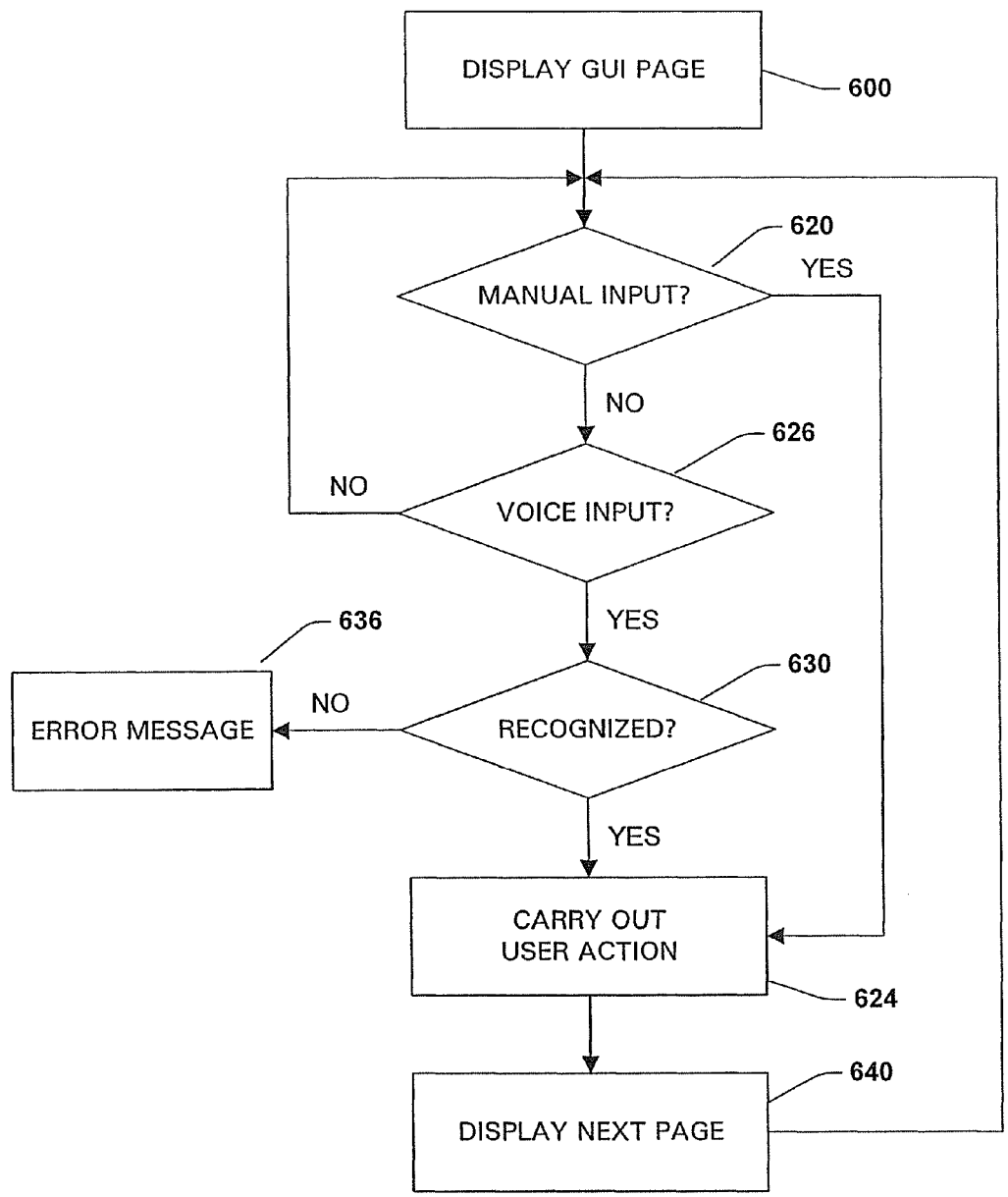
FIG. 8 is a flow chart representing processing steps in connection with displaying GUI pages and associated speech recognition in accordance with the present invention.
Figure 9:
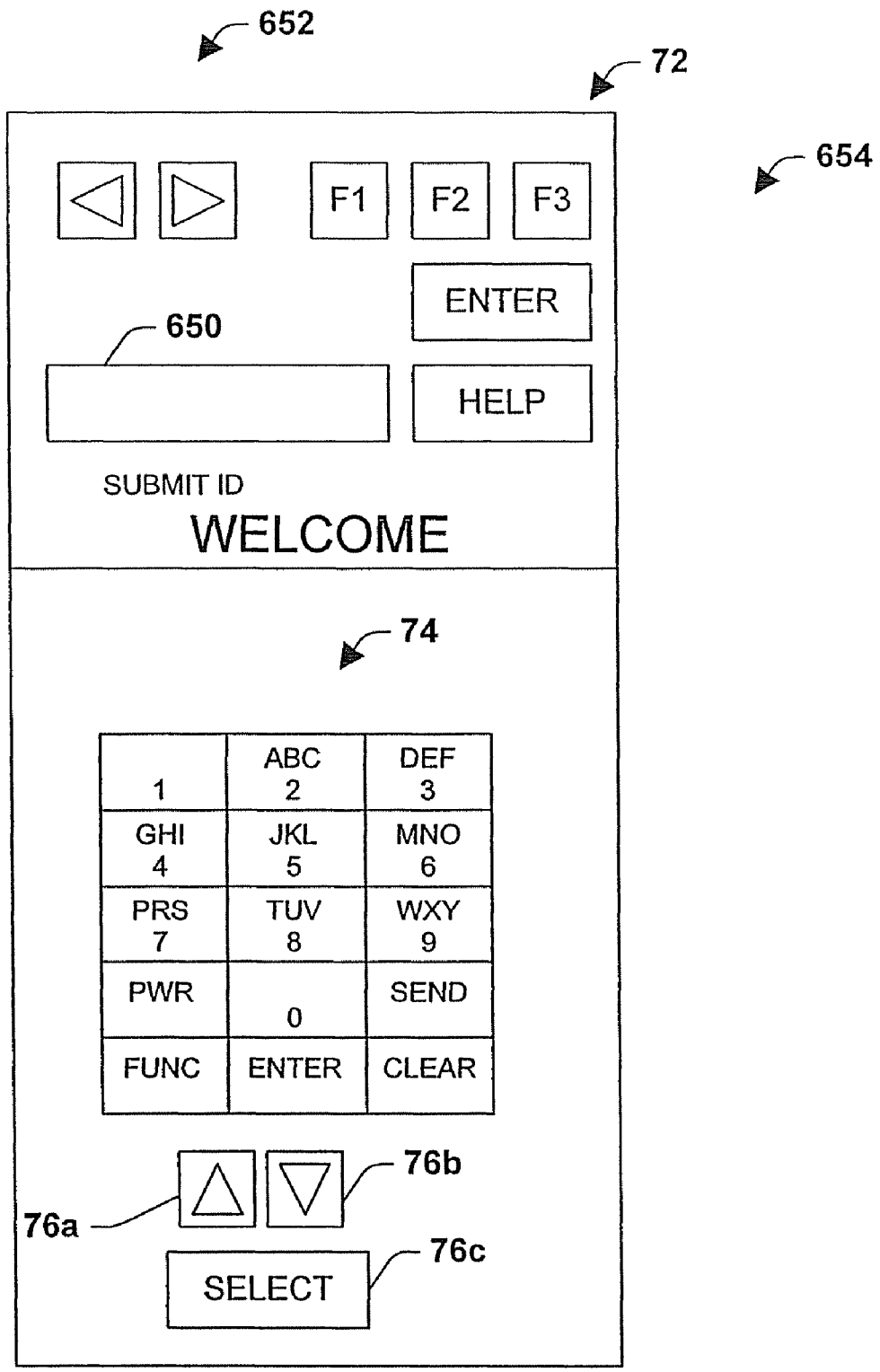
FIG. 9 is a representative diagram of a default web page in accordance with the present invention.

Referring now to FIG. 8, a flow diagram outlining one specific methodology for carrying out the present invention is provided. The mobile terminal 66 operates as a modified TCP/IP web browser. When the mobile terminal 66 is first powered, a default web page (see FIG. 9) is requested from the host computer 50 and, after received from the host computer 50 is displayed on the display 72 of the mobile terminal at step 600. Typically the default page will be a welcome form and will graphically appear as shown in FIG. 9.

This page includes the virtual keypad 74 which affords for manual entry of alphanumeric data as described above. Typically, the bottom of every web page will include the virtual keypad 74. The top portion of the screen includes an identification field 650 for inputting of user identification. The top portion of the display also includes forward and backward keys 652 for moving to a previous web page or to a next page as is well known in the art. There are also several function keys 654 (e.g., f1, f2, f3, enter, help, etc.) which facilitate user interaction with the mobile terminal 66. All of the aforementioned virtual keys provide for manual inputting of data. Furthermore, a user may execute/interact with these keys and fields via speech as will become readily apparent from the discussion herein.

After the GUI page 600 is displayed, the processor 150 determines whether data is being manually input by the user in step 620. If yes, the processor 150 proceeds to step 624 to interpret the user action. If no, the processor 150 proceeds to step 626 and determines if data is being input via speech. If the processor 150 determines in step 626 that a voice input is not being made the process returns to step 620. If a voice input is determined to have been made, the processor 150 proceeds to step 630 where it determines whether or not the speech utterances of the user are recognized. If no, the processor advances to step 636 where an error message is provided to the user. The error message may instruct the user to repeat the speech utterance again or may inform the user that the utterance is not a proper entry for this particular web page for example.

If in step 630 the utterance is recognized, the processor 150 interprets the user action corresponding to the utterance in step 624. After step 624, the processor 150 sends the interpreted user action to the host computer 50 for processing of the user action. Thereafter, in step 640 the host computer sends the mobile terminal 66 a new display page in response to the user action. The new display page will be sent in packet format a GUI file including corresponding dictionary file(s) and syntax file(s) to facilitate speech recognition of the new web page. The process then returns to step 620.

Figure 10:
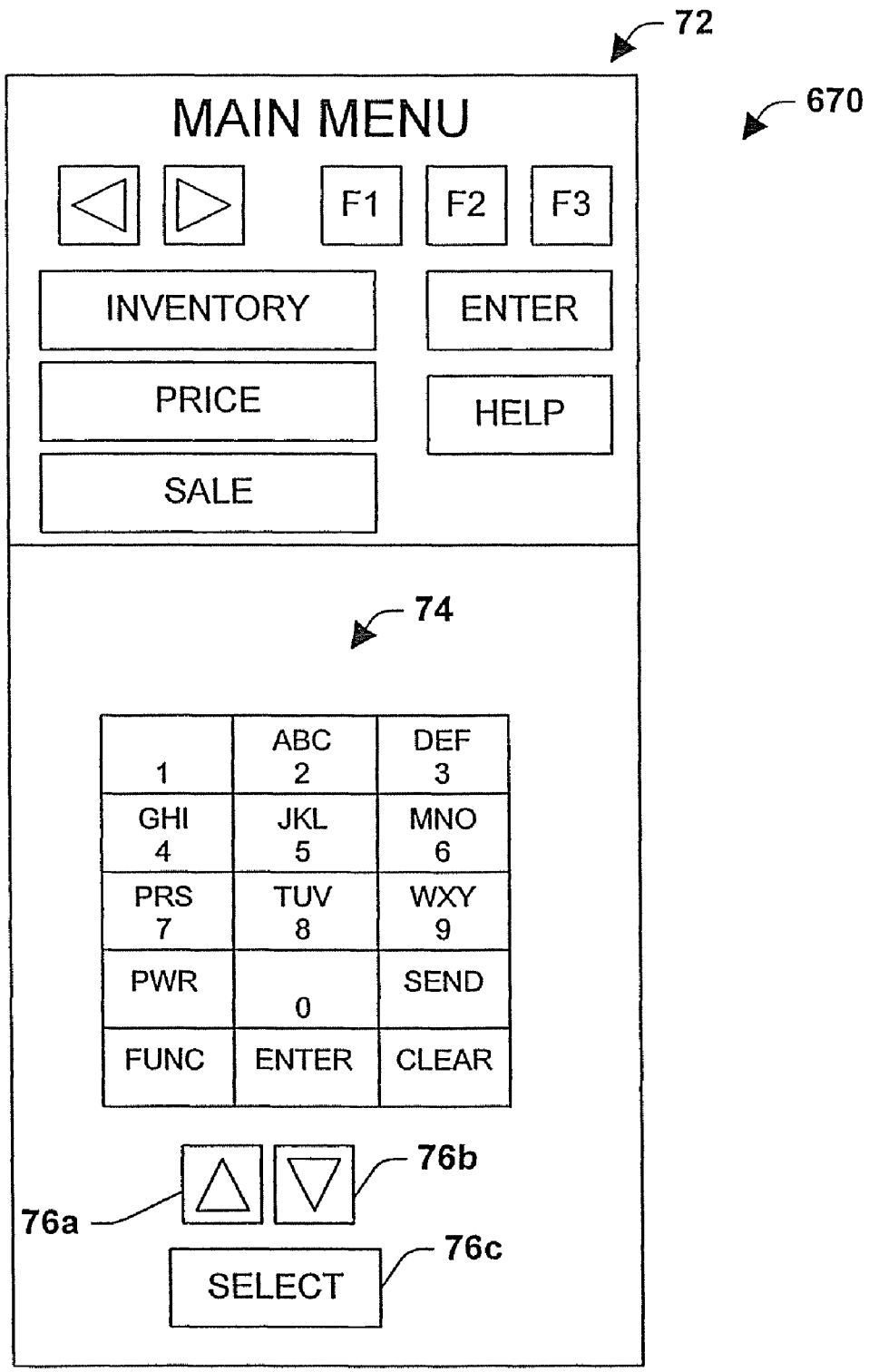
FIG. 10 is a representative diagram of a main menu web page in accordance with the present invention.

Turning now to FIGS. 8-10 in detail, a detailed discussion is provided as to the operation of the speech recognition system within the context of a user moving via speech commands from a first web page to a second web page. As noted above, FIG. 8 shows a representative welcome/default page that is initially viewed by a user upon activation of the mobile terminal 66. If a user desires to enter his/her identification the user can simply utter the word "ID" or "identification" or "user" or "submit" or the like to place a screen cursor within the identification field. As noted above, the GUI file for this particular web page includes dictionary file(s) and syntax file(s) which facilitate speech recognition of utterances in connection with the web page. The dictionary file(s) and syntax file(s) will contain phonemic data and production rules to provide for the speech recognition system and processor 150 to recognize that any of the words "ID" or "identification" or "user" or "submit" or the like should be interpreted to correspond to a user placing a cursor with the identification field. It is to be appreciated that the processor 150 of the mobile terminal 66 may implement minor user actions which relate to moving about and entering data within a particular web page as opposed to having the host computer 50 carry out such minor user actions.

Once the screen cursor is within the identification field 650, the user may utter his/her identification code which will be recognized and displayed within the field 650 as the letters or numbers are recognized. Once the ID is fully uttered and is displayed within the ID field 650, the user may utter "enter" which the speech recognition system will recognize as corresponding to a user pressing the virtual enter key.

Figure 11:
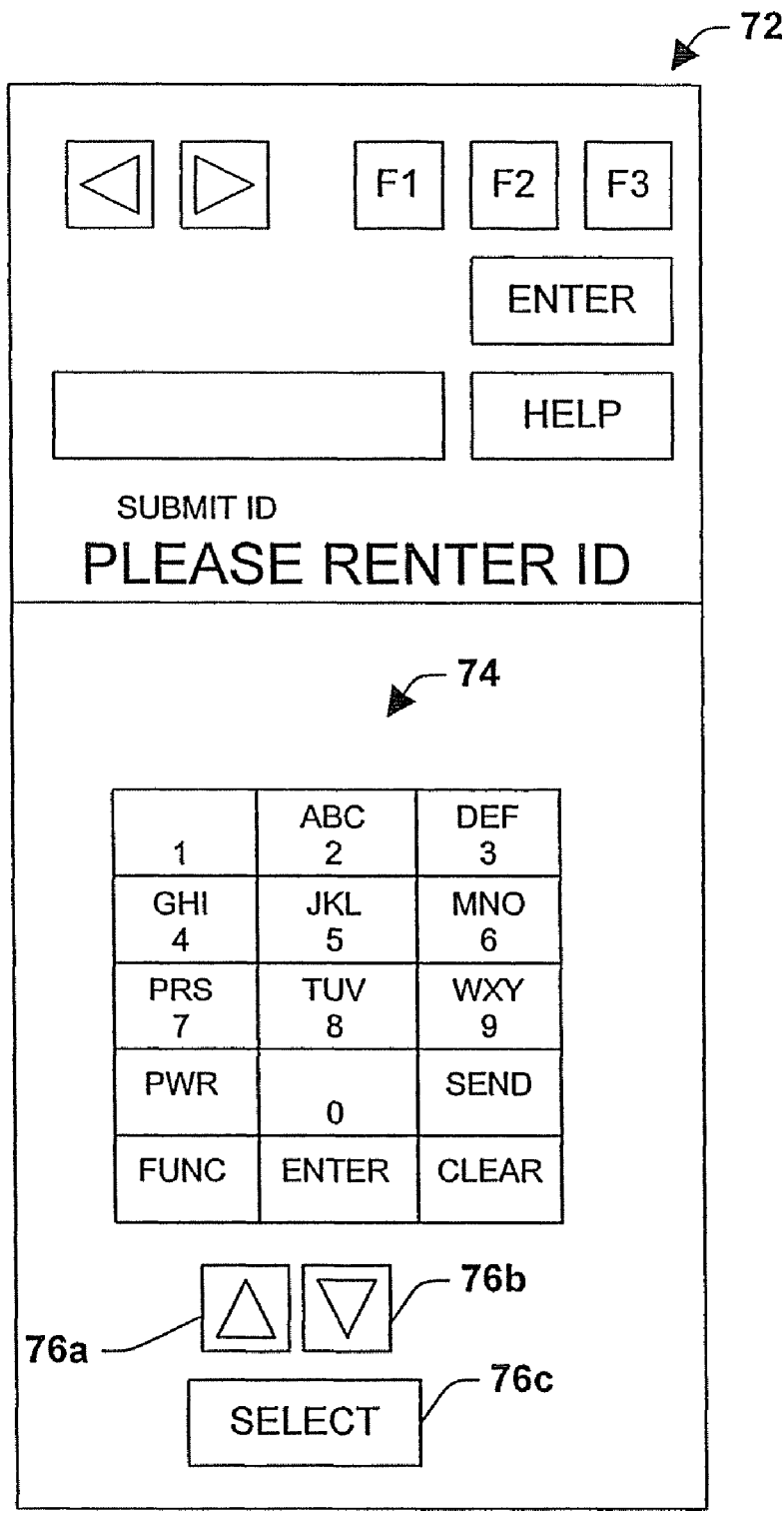
FIG. 11 is a representative diagram of a web page indicating a data entry error in accordance with the present invention.

After the ID is entered, the processor 150 sends this information to the host computer 50 which processes the data. If the user ID is correct, the host computer 50 sends the new GUI file to the mobile terminal 66 which corresponds to a main menu page 670 (FIG. 10). If the user ID is invalid, the host computer 50 sends another GUI file which corresponds to another web page similar in appearance to that of FIG. 8 except that the "welcome" is replaced with "Please Enter a Correct ID" as shown in FIG. 11.

Returning back to FIG. 10, the user can select from one of the various choices (inventory; price or sale) via speech or manually. For example, if a worker using the mobile terminal desires to confirm prices for particular items in the store, he/she simply needs to utter the command "price" or "cost" or "value" for the speech recognition system to recognize that the utterance corresponds to a user action of pressing the virtual button for price. After the utterance is recognized the processor 150 will send the user action relating to pressing the price button to the host computer 50. The host computer 50 will process this user action and send back to the mobile terminal 66 a new web page (not shown) which will provide for the user to employ the mobile terminal 66 to check or confirm the price of an item.

The user can thus navigate through any web pages sent from the host computer 50 manually or via speech in accordance with the discussion herein so as to interact with the mobile terminal 66 and the communication system 40 the mobile terminal 66 is operating in.

By attaching web page specific dictionary files and syntax files to a particular GUI file, the speech recognition system of the present invention can quickly and efficiently recognize and process user utterances in connection with a particular web page.

Although the present invention has been described with respect to the host computer 50 sending a new set of dictionary file(s) and syntax file(s) with every GUI file, it is to be appreciated that the mobile terminal 66 may store a limited set of dictionary file(s) and syntax file(s) to facilitate speech recognition of commands that are common to every or most web page that will appear on the mobile terminal 66. For example, dictionary file(s) and syntax file(s) for recognizing letters and numbers that could be entered through the virtual keyboard 74 may stored at the mobile terminal 66. In this manner, net RF bandwidth will be reduced because these files will not need to be sent with every GUI file 460.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A speech recognition system, comprising:
   a host computer operative to communicate at least one graphical user interface (GUI) display file to a mobile terminal, wherein the GUI files have attached thereto a dictionary file having phonemes and syntax file having allowable patterns of words being content specific to the graphical user interface (GUI) display file and associated with a particular context state; and
   the mobile terminal that displays one or more GUI pages associated with the received GUI files and receives speech input to assign a correct meaning to received input speech by
      determining a current context state of the received input speech,
      assigning one meaning to received input speech by utilizing the dictionary file and syntax file when the current context state is determined to be a first context state, and
      assigning a different meaning to the same received input speech by utilizing the dictionary file and syntax file when the current context state is determined to be a second context.

2. The system of claim 1, the host computer transmits visual information to/from the mobile terminal via employment of one or more web pages using GUI files.

3. The system of claim 2, the GUI files are further associated with an HTML file.

4. The system of claim 1, wherein at least one of the dictionary file or the syntax file are stored in a memory of the host computer.

5. The system of claim 1, wherein at least one of the dictionary file or the syntax file are stored in a memory of the mobile terminal to facilitate recognition of speech input at the mobile terminal.

6. A mobile terminal having speech recognition capabilities, comprising:
   an antenna for receiving one or more graphical user interface (GUI) files from a host computer, wherein the GUI files have attached thereto a dictionary file having phonemes and syntax file having allowable patterns of words being content specific to the graphical display file and associated with a particular context state;
   a processor;
   a memory to store the received one or more graphical user interface (GUI) files;
   a display operatively coupled to the processor, the display adapted to display at least one GUI based on the received one or more graphical user interface (GUI) files;
   a microphone for receiving speech input from a user; and a speech recognition system for determining a current context state of interactive communication with the user and assigning a correct meaning to received input speech by
      assigning one meaning to received input speech by utilizing the dictionary file and syntax file when the current context state is determined to be a first context state, and
      assigning a different meaning to the same received speech by utilizing the dictionary file and syntax file when the current context state is determined to be a second context state.

7. The mobile terminal of claim 6, the speech recognition system further comprises an acoustic processing system that receives inputs from the microphone and converts a spoken utterance to a digital signal.

8. The mobile terminal of claim 6, further comprises an operator input device in the form of a virtual keypad that is part of the web page being displayed.

9. The mobile terminal of claim 6, further including a bar code reader to facilitate input of data.

10. A method for facilitating speech recognition associated with a graphical user interface (GUI), comprising the steps of
   transmitting at least one graphical user interface (GUI) display file from a remote host computer to a mobile terminal, wherein the GUI files have attached thereto a dictionary file having phonemes and syntax file having allowable patterns of words being content specific to the graphical display file and associated with a particular context state;
   receiving input speech commands at the mobile terminal wherein the commands are associated with at least one GUI associated with the received GUI files;
   determining a current context state of interactive communications with the user; and utilizing a speech recognition system to assign a correct meaning to received speech command by
      assigning one meaning to received input speech command by utilizing the dictionary file and syntax file when the current context state is determined to be a first context state, and
      assigning a different meaning to the same received input speech command by utilizing the dictionary file and syntax file when the current context state is determined to be a second context state.

11. The method of claim 10, the assigned meaning is transmitted to the remote host computer.

12. The method of claim 10, determining a current context state further comprises loading a new syntax file into the speech recognition system each time there is a change in the context state.

13. The method of claim 10, storing the at least one of a dictionary file or syntax file within the mobile terminal to facilitate speech recognition at the mobile terminal.

14. The method of claim 10, associating the at least one of a dictionary or syntax file with the displayed GUI further comprises limiting at least one of the dictionary or syntax files to a permutation of commands and data which could validly be input in connection with the displayed GUI.

15. The method of claim 10, further comprising transmitting the GUI file comprising a HTML file to display the GUI, and at least one of a dictionary file or a syntax file to the mobile terminal by a remote computer.

16. The method of claim 10, the input speech commands facilitate user identification.

\* \* \* \* \*

UNITED STATES PATENT AND TRADEMARK OFFICE
CERTIFICATE OF CORRECTION

| | | |
|---|---|---|
| PATENT NO. | : 7,831,429 B2 | Page 1 of 1 |
| APPLICATION NO. | : 11/675899 | |
| DATED | : November 9, 2010 | |
| INVENTOR(S) | : O'Hagan | |

It is certified that error appears in the above-identified patent and that said Letters Patent is hereby corrected as shown below:

ON THE FACE PAGE

On Page 2, in Field (56), under "OTHER PUBLICATIONS", in Column 2, line 7, delete "Apr. 26, 2004" and insert -- Aug. 26, 2004 --, therefor.

IN THE DRAWINGS

In Fig. 2b, Sheet 3 of 12, for Tag "502", in Line 3, delete "DICTIONARYFILE" and insert -- DICTIONARY FILE --, therefor.

IN THE SPECIFICATION

In Column 5, Lines 55-56, delete "invention;" and insert -- invention. --, therefor.

In Column 5, Line 59, delete "EMBODIMENT" and insert -- EMBODIMENTS --, therefor.

IN THE CLAIMS

Column 18, Line 22, in Claim 10, delete "of" and insert -- of: --, therefor.

Signed and Sealed this
Twenty-ninth Day of May, 2012

David J. Kappos
*Director of the United States Patent and Trademark Office*